(12) United States Patent  
Flippen

(10) Patent No.: US 10,757,920 B2
(45) Date of Patent: Sep. 1, 2020

(54) LOOPED ELASTIC LEASH

(71) Applicant: Only Leash Corporation, Lahaina, HI (US)

(72) Inventor: Brett A. Flippen, Kihei, HI (US)

( * ) Notice: Subject to any disclaimer, the term of this patent is extended or adjusted under 35 U.S.C. 154(b) by 587 days.

(21) Appl. No.: 15/710,610

(22) Filed: Sep. 20, 2017

(65) Prior Publication Data

US 2018/0077907 A1    Mar. 22, 2018

Related U.S. Application Data

(60) Provisional application No. 62/397,646, filed on Sep. 21, 2016.

(51) Int. Cl.
*A01K 27/00*       (2006.01)

(52) U.S. Cl.
CPC .................................. *A01K 27/003* (2013.01)

(58) Field of Classification Search
CPC .. A01K 27/005; A01K 27/003; A01K 27/006; A01K 27/001
USPC ....... 119/795, 770, 792, 797, 798, 856, 863; D30/152, 153, 145
See application file for complete search history.

(56) References Cited

U.S. PATENT DOCUMENTS

| | | | | |
|---|---|---|---|---|
| 4,745,883 A | * | 5/1988 | Baggetta | A47D 13/086 |
| | | | | 119/770 |
| 5,109,803 A | * | 5/1992 | Dunham | A01K 27/007 |
| | | | | 119/654 |
| 5,749,326 A | * | 5/1998 | Jones | A01K 27/005 |
| | | | | 119/798 |
| 5,878,698 A | * | 3/1999 | Lyell | A01K 27/006 |
| | | | | 119/863 |
| D558,932 S | * | 1/2008 | Farrar | D30/152 |
| D590,568 S | * | 4/2009 | Crutchfield | D34/27 |
| D597,788 S | * | 8/2009 | Ellis | D7/387 |
| D615,712 S | * | 5/2010 | Peterson | D30/145 |
| D653,002 S | * | 1/2012 | Hull | D30/153 |
| 8,448,608 B2 | * | 5/2013 | Mucerino, Jr. | A01K 27/005 |
| | | | | 119/797 |
| D699,404 S | * | 2/2014 | Bobka-Cradduck | D30/145 |
| D703,394 S | * | 4/2014 | Bozeman | D30/152 |
| 9,549,535 B1 | * | 1/2017 | Rice | A01K 27/005 |
| 9,807,980 B2 | * | 11/2017 | Arnold | A01K 27/003 |
| 9,907,292 B2 | * | 3/2018 | Dudek | A01K 27/001 |
| 10,420,326 B1 | * | 9/2019 | Rand | A01K 27/003 |
| 2005/0132981 A1 | * | 6/2005 | Berry | A01K 27/006 |
| | | | | 119/856 |
| 2006/0150923 A1 | * | 7/2006 | Jones | A01K 27/003 |
| | | | | 119/795 |
| 2010/0024741 A1 | * | 2/2010 | Schoppman | A01K 27/006 |
| | | | | 119/795 |

(Continued)

*Primary Examiner* — Yvonne R Abbott-Lewis

(57) ABSTRACT

A looped elastic leash is a leash that is able to be stored around a neck of a pet animal, to be conveniently available to the user when walking or transporting animal. The looped elastic leash includes at least one elastic band, a covering fabric, a leash connector, and a collar-attachment hook. The at least one elastic band is configured into a loop by attaching a first band end and a second band end to the leash connector. The covering fabric encapsulates the at least one elastic band by attaching a first cover end and a second cover end to the leash connector. The collar-attachment hook is connected to the leash connector. The collar attachment hook engages a collar or harness worn by the animal.

19 Claims, 3 Drawing Sheets

(56) References Cited

U.S. PATENT DOCUMENTS

2013/0092101 A1\* 4/2013 Sylvanowicz ....... A01K 27/003
 119/795

\* cited by examiner

LOOPED ELASTIC LEASH

The current application claims a priority to the U.S. Provisional Patent application Ser. No. 62/397,646 filed on Sep. 21, 2016.

FIELD OF THE INVENTION

The present invention relates generally to an animal leash. More specifically, the present invention is a looped elastic leash that attaches to any animal collar or harness and is able to be stored around an animal's neck when not in use.

BACKGROUND OF THE INVENTION

Walking a pet animal, for example a dog, cat, or even a pet horse is an important aspect of pet ownership. Going on walks provides an outlet of energy and provides exercise for the animal. Typically, leashes are used by a person to maintain control of the pet's actions, to dissuade aggressive posturing, and to prevent the pet from wondering off during a walk. When the walk is over, the leash generally needs to be stored until the next walk or travel. Leashes can often be misplaced, leading to the leash not being found for the walk. In the case for pet dogs, a dog may be required to be walked with a leash when off the owner's premises, according to some local leash laws.

Therefore, an objective of the present invention is to provide a leash that is less easily misplaced. The present invention is a looped elastic leash that can be attached to any animal's collar or harness and positioned around the neck of the animal when not in use. Thus, the looped elastic leash is always present when the animal needs to be walked or transported. The present invention is preferably for medium to extra-large sized animals. As the present invention is elastic, the present invention accommodates all domesticated pet animals within this range. The present invention is made with patterned nylon and/or polyester webbing on the outside and heavy-duty elastic on the inside with a high-quality metal snap hook to provide durability and elasticity for the present invention through heavy use.

DETAIL DESCRIPTIONS OF THE INVENTION

All illustrations of the drawings are for the purpose of describing selected versions of the present invention and are not intended to limit the scope of the present invention.

The present invention is a looped elastic leash. The present invention attaches to a collar or harness for a pet animal, to allow the user to lead or control the actions of the animal. The present invention is able to be positioned around the animal's neck, to be conveniently stored between walking or transporting the animal. The present invention is elastic such that the present invention can expand to accommodate a plurality of neck diameters for medium or large sized animals, and the present invention returns to an original diameter when removed from the animal's neck or unstrained by the animal's motions.

Figure 1:
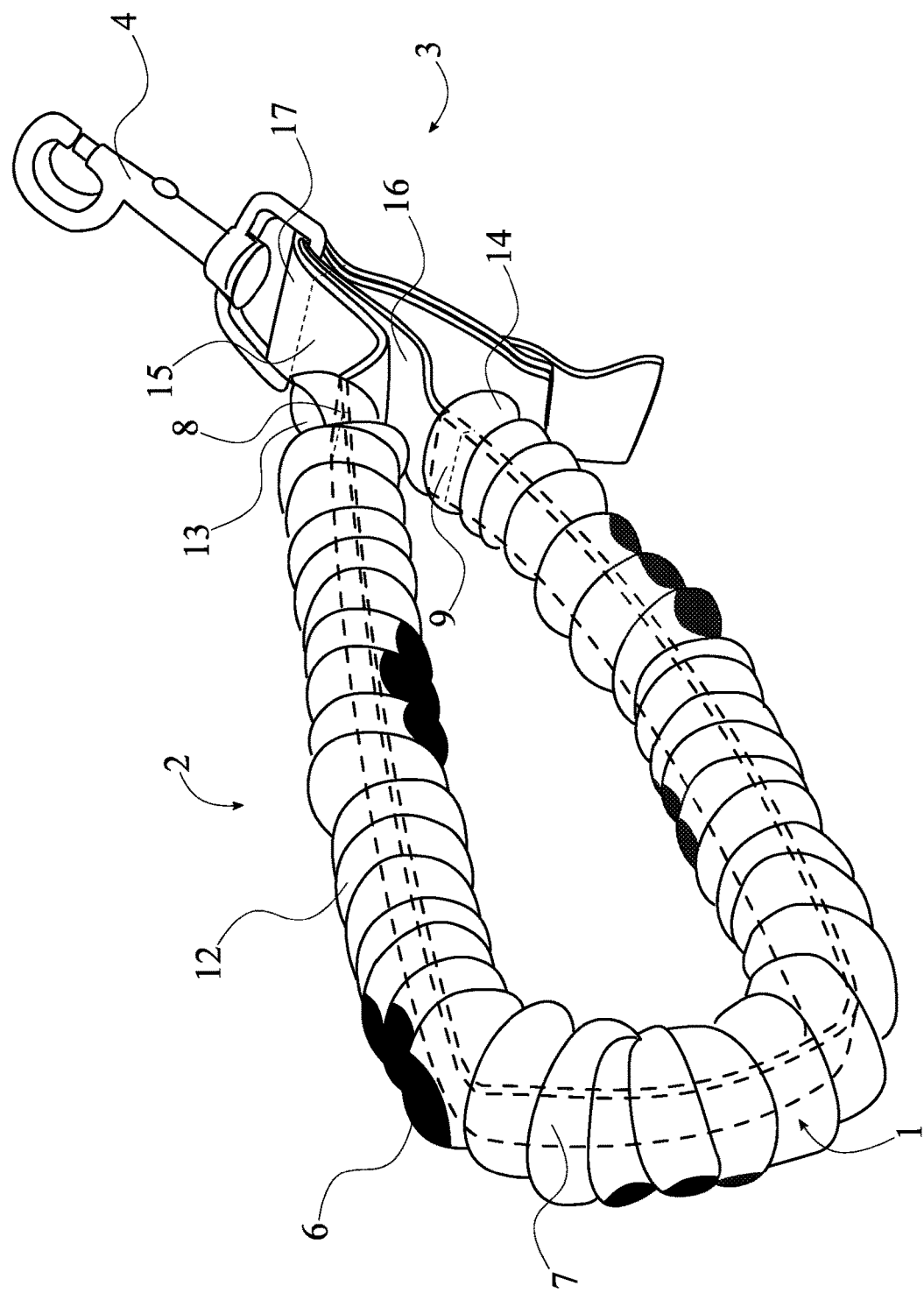
FIG. 1 is a perspective view of the present invention, wherein the at least one elastic band is shown within the covering fabric.
Figure 2:
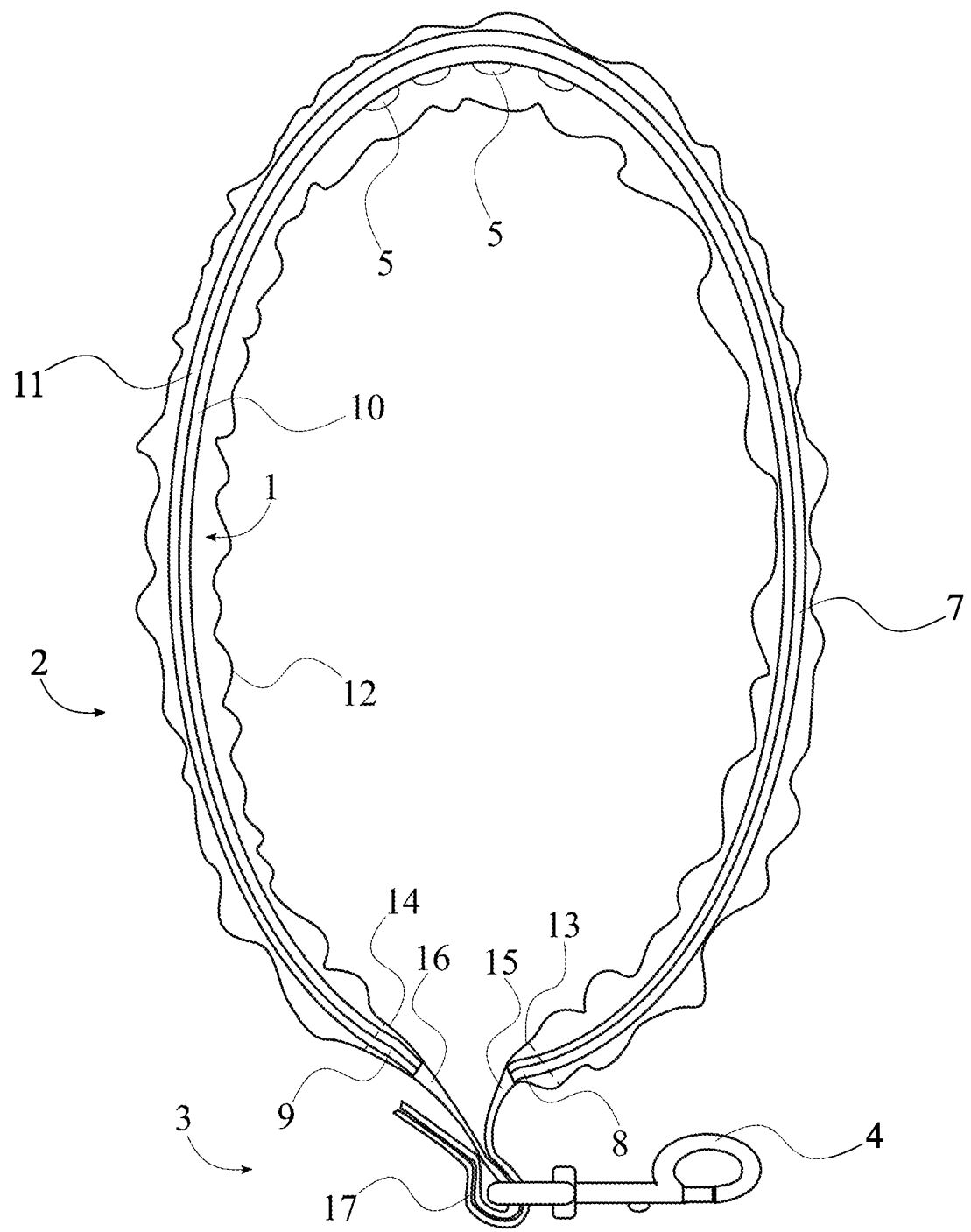
FIG. 2 is a schematic view of the present invention.

In accordance to FIG. 1 and FIG. 2, the present invention comprises at least one elastic band 1, a covering fabric 2, a leash connector 3, and a collar-attachment hook 4. The at least one elastic band 1 allows the present invention to return to form after the present invention is stretched. The at least one elastic band 1 is durable enough to sustain forces from the animal pulling against the user, while elastic enough to avoid suffocating the animal when the present invention is stored around the animal's neck. The at least one elastic band 1 comprises a band body 7, a first band end 8, and a second band end 9. The band body 7 provides a handle for the user to grasp the present invention to maintain control over the animal. The first band end 8 is oppositely positioned to the second band end 9 along the band body 7. The first band end 8 is adjacently connected to the second band end 9 in order to define a grasping loop to be held by the user or positioned around an animal's neck.

The covering fabric 2 provides a barrier between the animal's neck or user's hand and the at least one elastic band 1, to make interfacing with the present invention more comfortable and durable. Shown in FIG. 1 to FIG. 3, the covering fabric 2 envelops the at least one elastic band 1 in order to provide protection for the user and animal from abrasion of the at least one elastic band 1. The covering fabric 2 is preferred to be made of nylon or polyester; however, the covering fabric 2 may be any appropriate fabric to cover the at least one elastic band 1, such as cotton or leather, to prevent irritation to the user or the animal. The covering fabric 2 comprises a cover body 12, a first cover end 13, and a second cover end 14. The first cover end 13 is oppositely positioned to the second cover end 14 along the cover body 12. The first band end 8 is adjacently connected to first cover end 13. Similarly, the second band end 9 is adjacently connected to the second band end 9 in order to encapsulate the at least one elastic band 1. In accordance to the preferred embodiment, the covering fabric 2 is preferred to be ruched in order to allow the at least one elastic band 1 to expand unhindered within the covering fabric 2.

The leash connector 3 transfers forces of the animal straining against the present invention between at least one elastic band 1 and the collar-attachment hook 4. The first cover end 13 is adjacently connected to the leash connector 3. Similarly, the second cover end 14 is adjacently connected to the leash connector 3. This configuration allows the covering fabric 2 to fully encapsulate the at least one elastic band 1 and defines a loop for the present invention to be held or placed around the animal's neck.

The collar-attachment hook 4 allows the present invention to quickly engage or disengage from a collar or harness worn by the animal. In accordance to FIG. 1 to FIG. 3, the collar-attachment hook 4 is coupled with the leash connector 3. The collar-attachment hook 4 is preferred to be a bolt snap hook; however, the collar-attachment hook 4 may be any attachment hook that is able to quickly engage or disengage from the animal's collar.

In accordance to the preferred embodiment of the present invention, the leash connector 3 comprises a first fabric joint 15, a second fabric joint 16, and a hook-attachment loop 17. The first fabric joint 15 and the second fabric joint 16 secure the covering fabric 2 and the at least one elastic band 1 to the leash connector 3. The first fabric joint 15 is radially connected to the hook-attachment loop 17. The second fabric joint 16 is radially connected to the hook-attachment loop 17. The first cover end 13 and the first band end 8 is adjacently connected to the first fabric joint 15. Similarly, the second cover end 14 and the second band end 9 are adjacently connected to the second fabric joint 16. The collar-attachment hook 4 is coupled with the hook-attachment loop 17. This configuration allows the force of an animal pulling on the present invention to be transferred through the collar-attachment hook 4, the hook-attachment loop 17, through both the first fabric joint 15 and second fabric joint 16, and into the at least one elastic band 1. For a specific embodiment of the present invention, the first fabric joint 15 is adjacently positioned to the second fabric joint 16 about the hook-attachment loop 17 in order to prevent the hook-attachment loop 17 from being pressed into the animal's neck as the present invention is positioned around the animal's neck.

More specific to the preferred embodiment of the present invention, the at least one elastic band 1 comprises a first elastic band 10 and a second elastic band 11, as shown in FIG. 2. The first elastic band 10 is pressed against the second elastic band 11. The first elastic band 10 and the second elastic band 11 provide additional durability for the elastic properties of the at least one elastic band 1 by distributing the tension forces between both the first elastic band 10 and the second elastic band 11.

For an alternate embodiment of the present invention, the present invention comprises a plurality of gripping extrusions 5, detailed in FIG. 2. The plurality of gripping extrusions 5 assists the user with grasping the present invention by increasing points of contact between the user's hand and the present invention. The plurality of gripping extrusions 5 is integrated along the band body 7.

Figure 3:
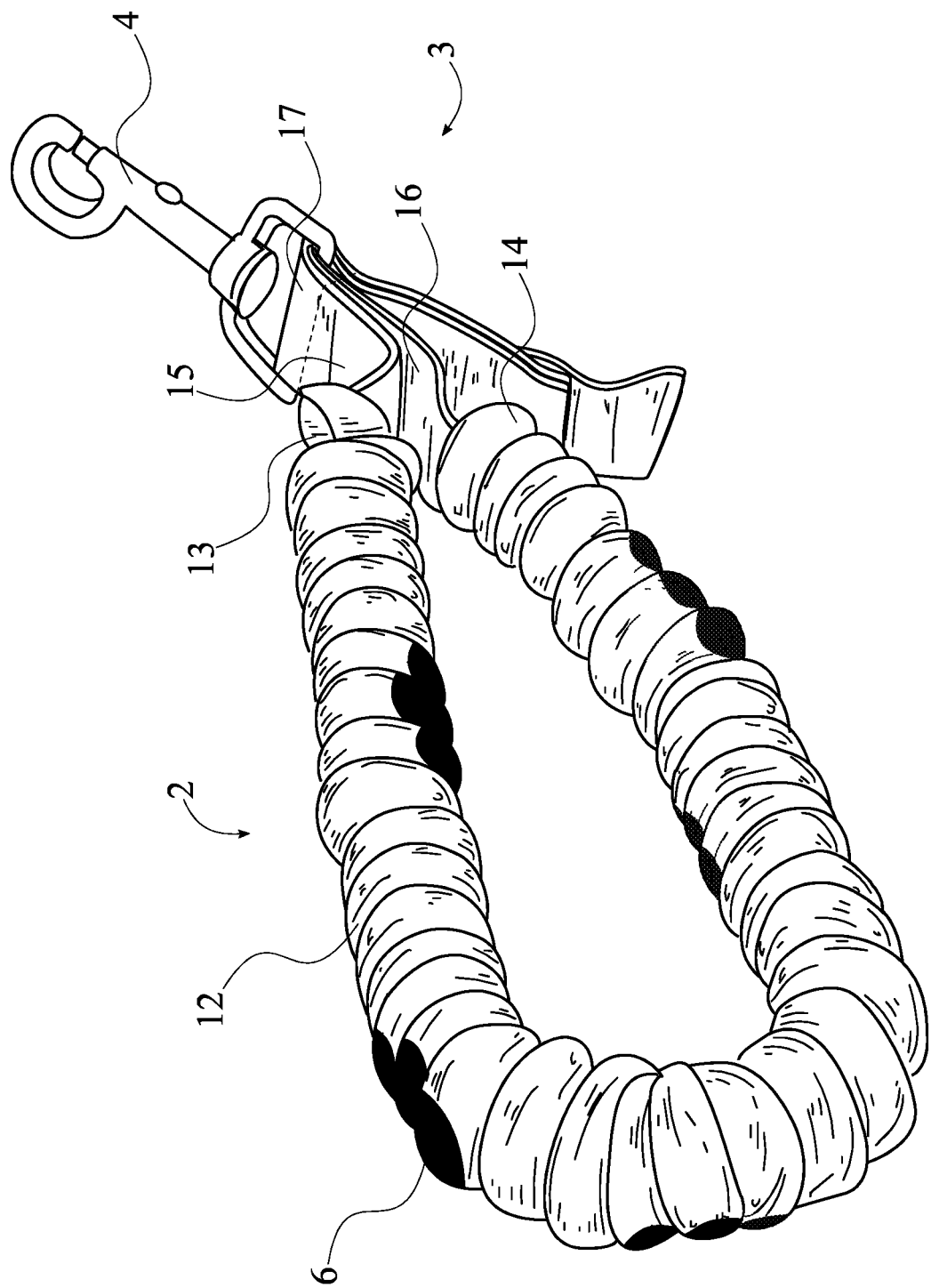
FIG. 3 is a perspective view of the present invention.

Further in accordance to the preferred embodiment of the present invention, the present invention comprises a patterned aesthetic 6, show in FIG. 1 and FIG. 3. The patterned aesthetic 6 is superimposed onto the covering fabric 2 to provide an aesthetic appeal to the present invention by displaying an image or pattern on the covering fabric 2.

In implementation of the present invention, the collar-attachment hook 4 engages a d-ring or any leash receiver of a collar or harness worn by the animal. The user grasps the present invention around the cover body 12 and the band body 7 to maintain control over or direct the animal for walking or transporting. When the user is finished walking or transporting the animal, the user can disengage the collar-attachment hook 4 from the animal's collar. Alternatively, the present invention may be positioned around the animal's neck by sliding the animal's head through the grasping loop and positioning the grasping loop around the animal's neck. Thus, the present invention is conveniently available to walk or transport the animal.

Although the invention has been explained in relation to its preferred embodiment, it is to be understood that many other possible modifications and variations can be made without departing from the spirit and scope of the invention as hereinafter claimed.

What is claimed is:
1. A looped elastic leash comprises:
at least one elastic band;
a covering fabric;
a leash connector;
a collar-attachment hook;
each of the at least one elastic band comprises a band body, a first band end, and a second band end;
the covering fabric comprises a cover body, a first cover end, and a second cover end;
the first band end being oppositely positioned to the second band end along the band body;
the covering fabric enveloping the at least one elastic band;
the first band end being adjacently connected to the first cover end;
the second band end being adjacently connected to the second cover end;
the first cover end being oppositely positioned to the second cover end along the cover body;
the first cover end being adjacently connected to the leash connector;
the second cover end being adjacently connected to the leash connector;
the collar-attachment hook being coupled with the leash connector.

2. The looped elastic leash, as claimed in claim 1, comprises:
the leash connector comprises a first fabric joint, a second fabric joint, and a hook-attachment loop;
the first fabric joint being radially connected to the hook-attachment loop;
the second fabric joint being radially connected to the hook-attachment loop;
the first cover end and the first band end being adjacently connected to the first fabric joint;
the second cover end and the second band end being adjacently connected to the second fabric joint;
the collar-attachment hook being coupled with the hook-attachment loop.

3. The looped elastic leash, as claimed in claim 2, comprises:
the first fabric joint being adjacently positioned to the second fabric joint about the hook-attachment loop.

4. The looped elastic leash, as claimed in claim 1, comprises:
the at least one elastic band comprises a first elastic band and a second elastic band;
the first elastic band being pressed against the second elastic band.

5. The looped elastic leash, as claimed in claim 1, comprises:
a plurality of gripping extrusions;
the plurality of gripping extrusions being integrated along the band body.

6. The looped elastic leash, as claimed in claim 1, comprises:
a patterned aesthetic;
the patterned aesthetic being superimposed onto the covering fabric.

7. The looped elastic leash, as claimed in claim 1, wherein the collar-attachment hook is a bolt snap hook.

8. The looped elastic leash, as claimed in claim 1, wherein the covering fabric is made from nylon.

9. The looped elastic leash, as claimed in claim 1, wherein the covering fabric is made from polyester.

10. The looped elastic leash, as claimed in claim 1, wherein the covering fabric is ruched.

11. A looped elastic leash comprises:
at least one elastic band;
a covering fabric;
a leash connector;
a collar-attachment hook;
each of the at least one elastic band comprises a band body, a first band end, and a second band end;
the covering fabric comprises a cover body, a first cover end, and a second cover end;
the leash connector comprises a first fabric joint, a second fabric joint, and a hook-attachment loop;
the first band end being oppositely positioned to the second band end along the band body;

the covering fabric enveloping the at least one elastic band;

the first band end being adjacently connected to the first cover end;

the second band end being adjacently connected to the second cover end;

the first cover end being oppositely positioned to the second cover end along the cover body;

the first cover end being adjacently connected to the leash connector;

the second cover end being adjacently connected to the leash connector;

the collar-attachment hook being coupled with the leash connector;

the first fabric joint being radially connected to the hook-attachment loop;

the second fabric joint being radially connected to the hook-attachment loop;

the first cover end and the first band end being adjacently connected to the first fabric joint;

the second cover end and the second band end being adjacently connected to the second fabric joint;

the collar-attachment hook being coupled with the hook-attachment loop.

12. The looped elastic leash, as claimed in claim 11, comprises:

the first fabric joint being adjacently positioned to the second fabric joint about the hook-attachment loop.

13. The looped elastic leash, as claimed in claim 11, comprises:

the at least one elastic band comprises a first elastic band and a second elastic band;

the first elastic band being pressed against the second elastic band.

14. The looped elastic leash, as claimed in claim 11, comprises:

a plurality of gripping extrusions;

the plurality of gripping extrusions being integrated along the band body.

15. The looped elastic leash, as claimed in claim 11, comprises:

a patterned aesthetic;

the patterned aesthetic being superimposed onto the covering fabric.

16. The looped elastic leash, as claimed in claim 11, wherein the collar-attachment hook is a bolt snap hook.

17. The looped elastic leash, as claimed in claim 11, wherein the covering fabric is made from nylon.

18. The looped elastic leash, as claimed in claim 11, wherein the covering fabric is made from polyester.

19. The looped elastic leash, as claimed in claim 11, wherein the covering fabric is ruched.

* * * * *